United States Patent
Rentfrow et al.

(10) Patent No.: US 10,060,504 B2
(45) Date of Patent: Aug. 28, 2018

(54) CENTRIFUGAL PENDULUM ABSORBER INCLUDING SPRINGS FIXED TO CIRCUMFERENTIAL EDGES OF MASSES

(71) Applicant: Schaeffler Technologies AG & Co. KG, Herzogenaurach (DE)

(72) Inventors: Peter Rentfrow, Smithville, OH (US); Phani Krishna Kalapala, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 85 days.

(21) Appl. No.: 15/135,070

(22) Filed: Apr. 21, 2016

(65) Prior Publication Data
US 2017/0307047 A1 Oct. 26, 2017

(51) Int. Cl.
*F16F 15/14* (2006.01)
*F16F 15/12* (2006.01)
(Continued)

(52) U.S. Cl.
CPC ...... *F16F 15/145* (2013.01); *F16F 15/12326* (2013.01); *F16H 45/02* (2013.01); *F16F 2226/04* (2013.01); *F16H 2045/0263* (2013.01)

(58) Field of Classification Search
CPC ...... F16F 15/12; F16F 15/1202; F16F 15/121; F16F 15/1213; F16F 15/123;
(Continued)

(56) References Cited

U.S. PATENT DOCUMENTS

| 4,360,352 A | 11/1982 | Lamarche |
| 7,484,434 B2 * | 2/2009 | Jung ................. F16F 15/13438 74/574.4 |

(Continued)

FOREIGN PATENT DOCUMENTS

| DE | 102014210489 A1 * | 12/2014 | ............ F16F 15/145 |
| DE | 102014210489 A1 | 12/2014 | |

(Continued)

OTHER PUBLICATIONS

Machine translation of DE 102014210489 A1 obtained on Sep. 9, 2017.*

(Continued)

*Primary Examiner* — Adam D Rogers
(74) *Attorney, Agent, or Firm* — Davidson, Davidson & Kappel, LLC

(57) ABSTRACT

A centrifugal pendulum absorber is provided. The centrifugal pendulum absorber includes a first pair of masses, a second pair of masses, and a spring extending circumferentially from first notches in the masses of the first pair into second notches in the masses of the second pair. The spring connects the first pair of masses and the second pair of masses and includes a first enlarged end portion extending past an outer diameter of coils of the spring and a second enlarged end portion extending past the outer diameter of the coils of the spring. The first enlarged end portion is connected to the first pair of masses in the first notches without an interference fit and the second enlarged end portion being connected to the second pair of masses in the second notches without an interference fit. A method of forming a centrifugal pendulum absorber is also provided.

11 Claims, 3 Drawing Sheets

(51) Int. Cl.
*F16H 45/02* (2006.01)
*F16F 15/123* (2006.01)

(58) Field of Classification Search
CPC ........... F16F 15/12313; F16F 15/12326; F16F 15/13128; F16F 15/134; F16F 15/13415; F16F 15/1343; F16F 15/13438; F16F 15/13453; F16F 15/14; F16F 15/1414; F16F 15/1421; F16F 15/145; F16F 2226/04; F16H 45/02; F16H 2045/0263
See application file for complete search history.

(56) References Cited

U.S. PATENT DOCUMENTS

| | | | | |
|---|---|---|---|---|
| 7,862,437 | B2* | 1/2011 | Clark | F16F 15/12326 464/68.92 |
| 8,863,892 | B2* | 10/2014 | Kombowski | G10K 11/002 181/207 |
| 9,482,306 | B2* | 11/2016 | Malley | F16F 15/13438 |
| 2006/0032717 | A1 | 2/2006 | Jee et al. | |
| 2009/0088261 | A1 | 4/2009 | Clark et al. | |
| 2017/0108078 | A1* | 4/2017 | Dinger | F16F 15/1414 |

FOREIGN PATENT DOCUMENTS

| | | | | |
|---|---|---|---|---|
| DE | 102014216807 A1 * | 2/2016 | | F16F 15/133 |
| DE | 102015204027 A1 * | 9/2016 | | F16F 15/145 |
| EP | 1120582 A1 | 8/2001 | | |
| EP | 3002479 A1 | 4/2016 | | |
| WO | WO 2015/149789 A1 | 10/2015 | | |
| WO | WO 2015/149802 A1 | 10/2015 | | |
| WO | WO-2015149794 A1 * | 10/2015 | | F16F 15/145 |

OTHER PUBLICATIONS

Corresponding PCT International Search Report and Written Opinion for PCT/US2017/028692.

* cited by examiner

CENTRIFUGAL PENDULUM ABSORBER INCLUDING SPRINGS FIXED TO CIRCUMFERENTIAL EDGES OF MASSES

The present disclosure relates generally to torque converters and more specifically to centrifugal pendulum absorbers of torque converters.

BACKGROUND

DE 102014210489, WO 2015/149789 A1 and WO 2015/149802 A1 disclose providing springs circumferentially between masses of centrifugal pendulum absorber. Conventional designs, such those discloses in DE 102014210489, clamp the spring between the masses with an interference fit. Such designs are sensitive to variance in spring length and the number of dead coils.

SUMMARY OF THE INVENTION

A centrifugal pendulum absorber is provided. The centrifugal pendulum absorber includes a first pair of masses, a second pair of masses, and a spring extending circumferentially from first notches in the masses of the first pair into second notches in the masses of the second pair. The spring connects the first pair of masses and the second pair of masses and includes a first enlarged end portion extending past an outer diameter of coils of the spring and a second enlarged end portion extending past the outer diameter of the coils of the spring. The first enlarged end portion is connected to the first pair of masses in the first notches without an interference fit and the second enlarged end portion being connected to the second pair of masses in the second notches without an interference fit. A method of forming a centrifugal pendulum absorber is also provided.

A torque converter including the centrifugal pendulum absorber is also provided. The torque converter includes a damper assembly including the centrifugal pendulum absorber.

A method of forming a centrifugal pendulum absorber is also provided. The method includes inserting a first enlarged end portion of a spring into first notches of a first pair of masses to fix the first enlarged end portion to the first pair of masses without an interference fit, the first enlarged end portion extending past an outer diameter of coils of the spring; and inserting a second enlarged end portion of a spring into second notches of a second pair of masses to fix the second enlarged end portion to the second pair of masses without an interference fit, the second enlarged end portion extending past the outer diameter of the coils of the spring. The spring connects the first pair of masses and the second pair of masses circumferentially together

BRIEF DESCRIPTION OF THE DRAWINGS

The present invention is described below by reference to the following drawings, in which.

DETAILED DESCRIPTION

The disclosure provides a first embodiment including a flanged spring for a centrifugal pendulum absorber (CPA) having coils of a larger diameter at each end. CPA mass 'fingers' positively retain the spring in the tangential direction and sandwiching the spring between the masses retains the spring in the axial direction. The design may result in space-savings, may reliably retain springs with a large range of lengths and diameters and may require less dead coils than using an interference fit. A second embodiment is also provided in which a coil spring includes an endcap having a larger outer diameter than the spring in order to retain the spring in a tangential direction, which may result in a space savings and reduce the number of dead coils needed on springs thereby increasing the performance of the spring.

Figure 1:
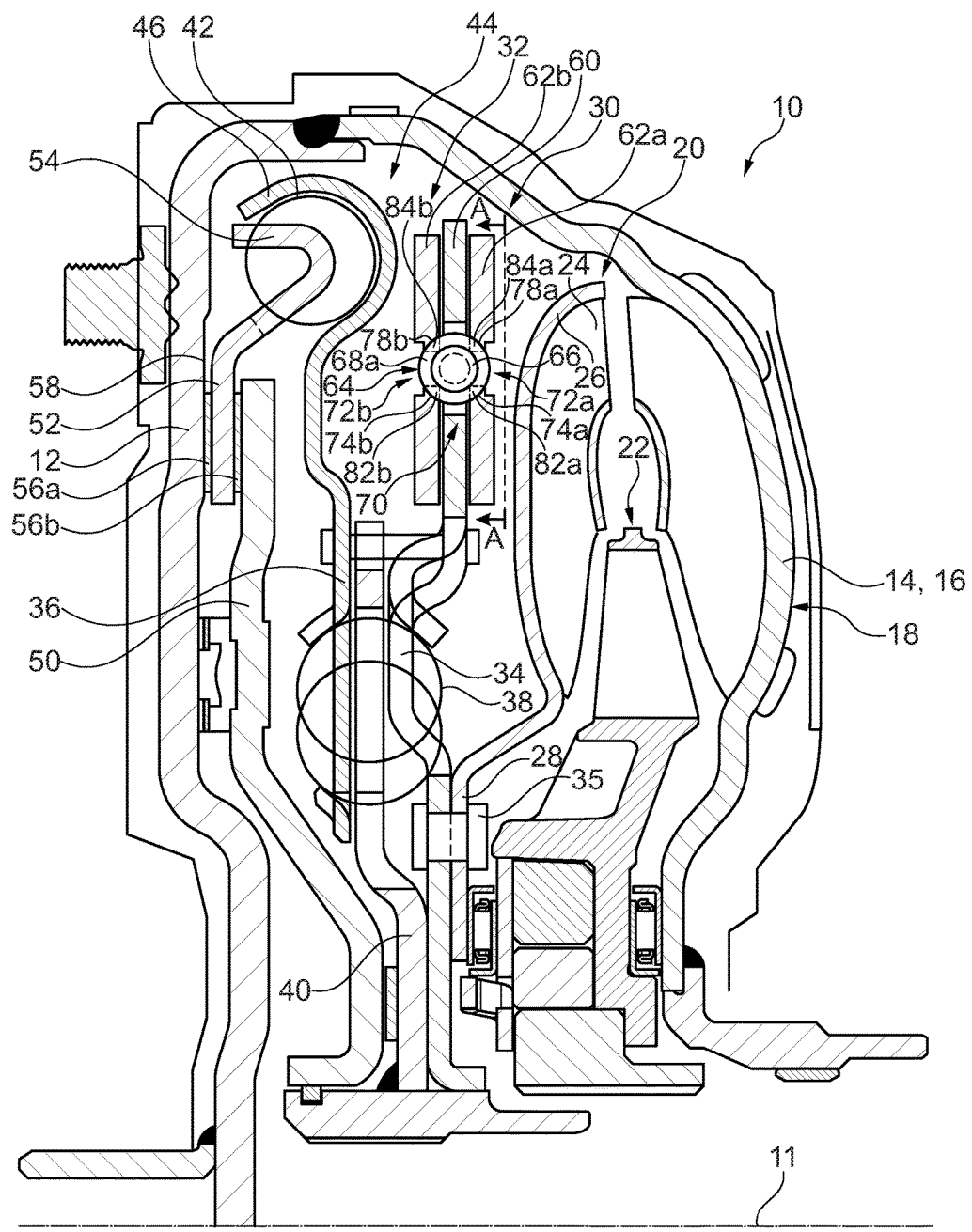
FIG. 1 schematically shows a cross-sectional side view of a torque converter in accordance with an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 opposite impeller 18 and a stator 22 axially between impeller 18 and turbine 20. Turbine 20 includes a plurality of blades 24 supported on a rounded portion 26 of turbine 20 at a rear-cover side of turbine 20. Turbine 20 further includes an inner radial extension 28 protruding radially inward from rounded portion 26. On a front-cover side of turbine 20, turbine 20 is connected to a damper assembly 30.

Damper assembly 30 includes a CPA 32 in accordance with an embodiment of the present invention, which is discussed in further detail below. Damper assembly 30 further includes a first cover plate 34 that is riveted to inner radial extension 28 of turbine 20 by rivets 35 and a second cover plate 36 axially between first cover plate 34 and front cover 12, with cover plates 34, 36 supporting a plurality of circumferentially spaced radially inner set of springs 38 axially therebetween. Sandwiched axially between cover plates 34, 36, damper assembly 30 includes a drive flange 40 whose inner radial end is configured as a hub for connecting to a transmission input shaft. Drive flange 40 includes a plurality of circumferentially extending slots formed therein for receiving springs 38. Radially outside of springs 38, damper assembly 30 further includes a plurality of circumferentially spaced radially outer set of springs 42. A radially outer end 44 of second cover plate 36 forms a spring retainer 46 for receiving springs 42.

A piston 50 is provided between front cover 12 and damper assembly 30 and a clutch plate 52 is provided axially between piston 50 and front cover 12. Clutch plate 52, at a radially outer end thereof, includes a plurality of circumferentially spaced projections 54 for extending into the circumferential spaces formed between springs 42. Clutch plate 50, at a radially inner end thereof, is provided with a friction material 56a on a front cover side thereof for engaging an inner axial surface 58 of front cover 12 and a friction material 56b on a rear cover side thereof for engaging piston 50. Piston 50, clutch plate 52 and inner axial surface 58 form a lockup clutch for drivingly coupling turbine 20 to front cover 12 via damper assembly 30. Fluid pressure differences between a front cover side of piston 50 and a rear cover side of piston 50 control whether piston 50 engages or is disengaged from front cover 12. Cover plates 34, 36 transfer torque from turbine 20 to drive flange 40, which in turn drives the transmission input shaft. Cover plates 34, 36 together transfer torque to springs 42, which transfer torque to clutch plate 52.

Referring back to CPA 32, it includes a flange 60, which is formed at a radially outer end of cover plate 34 and two sets of masses—a set of rear side masses 62a facing a rear cover side of torque converter 10 and a set of front side masses 62b facing a front cover side of torque converter 10—on opposite axial sides of flange 60. Each set of masses 62a, 62b includes a plurality of masses circumferentially offset from each other. In one preferred embodiment, CPA 32 includes four masses 62a and four masses 62b. Masses 62a, 62b are circumferentially movable with respect to flange 60 by rollers during operation of torque converter 10. Each mass 62a is paired with one of masses 62b, forming a plurality of pairs of masses 62a, 62b—here four pairs of masses 62a, 62b. Each pair of masses 62a, 62b is connected to both of the circumferentially adjacent pairs of masses 62a, 62b by a respective spring 64, as is further detailed below with respect to FIGS. 2a, 2b. In other words, at a first circumferential end thereof, each pair of masses 62a, 62b is connected to a circumferential end of a first additional pair of masses 62a, 62b by one spring 64, and at a second circumferential end thereof, each pair of masses 62a, 62b is connected to a circumferential end of a second additional pair of masses 62a, 62b by another spring 64. Spring 64 is formed by a plurality of central coils 66 and at least one first end coil 68 at a first circumferential end of spring 64 and at least one second end coil 69 (FIGS. 2 and 3) at a second circumferential end of spring 64, with central coils 66 extending circumferentially from end coil 68 to end coil 69. Coils 68, 69 have a greater inner and outer diameter than coils 66 and form enlarged end portions that protrude past the outer diameter of central coils 66 and are connected to masses 62a, 62b without an interference fit.

Flange 60 includes a plurality of circumferentially extending slots 70 that are circumferentially spaced from each other, each for receiving one of springs 64. Masses 62a, 62b are also each provided with a respective notch 72a, 72b at both circumferential ends thereof, each for receiving the respective at least one end coil 68, 69. Notches 72a, 72b each extend axially through the respective mass 62a, 62b and include a respective radially inner curved surface 74a, 74b defining a respective arc shaped groove 76a, 76b (FIGS. 2, 3) therein and a respective radially outer curved surface 78a, 78b defining a respective arc shaped groove 80a, 80b (FIGS. 2, 3) therein. Defining a circumferential edges of notches 72a, 72b, masses 62a, 62b each includes a respective radially inner lip 82a, 82b extending radially outward from the respective groove 76a, 76b and a respective radially outer lip 84a, 84b extending radially inward from the respective groove 86a, 86b. Curved surfaces 74a, 74b, 78a, 78b all contact an outer diameter surface of the respective at least one end coil 68, 69 and lips 82a, 82b, 84a, 84b all contact a respective radially extending edge 87, 89 (see FIG. 2, 3—i.e., the radially extending circumferentially facing edge of the respective at least one coil 68, 69 that is adjacent to central coil 66) of the respect at least one coil 68, 69. Accordingly, curved surfaces 74a, 74b, 78a, 78b are configured for axially and radially retaining the corresponding at least one end coil 68, 69 the while lips 82a, 82b, 84a, 84b are configured for circumferentially retaining the corresponding at least one end coil 68, 69 from pulling out of the respective notch 72a, 72b.

Figure 2:
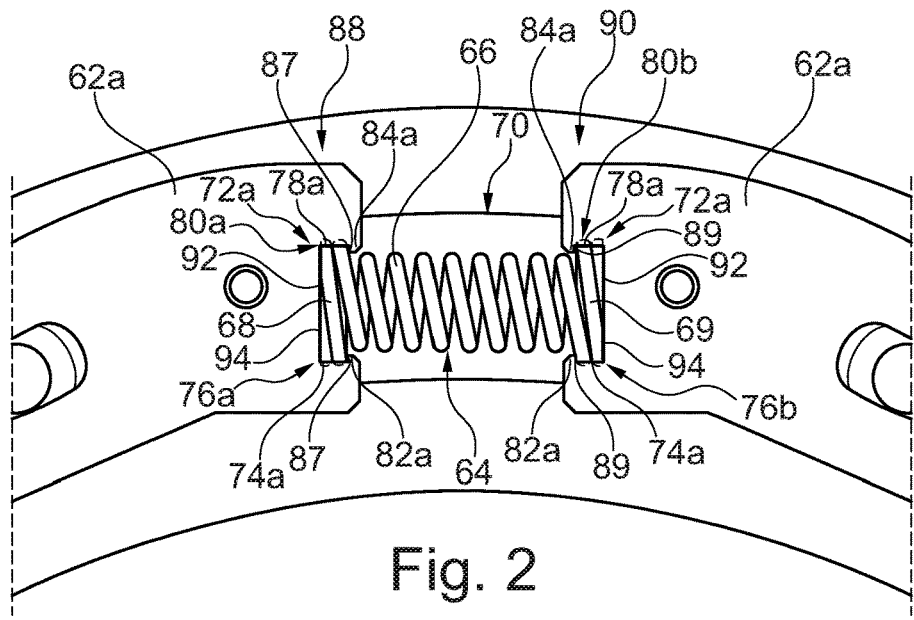
FIG. 2 shows an axial facing view of a portion of the CPA along A-A in FIG. 1.
Figure 3:
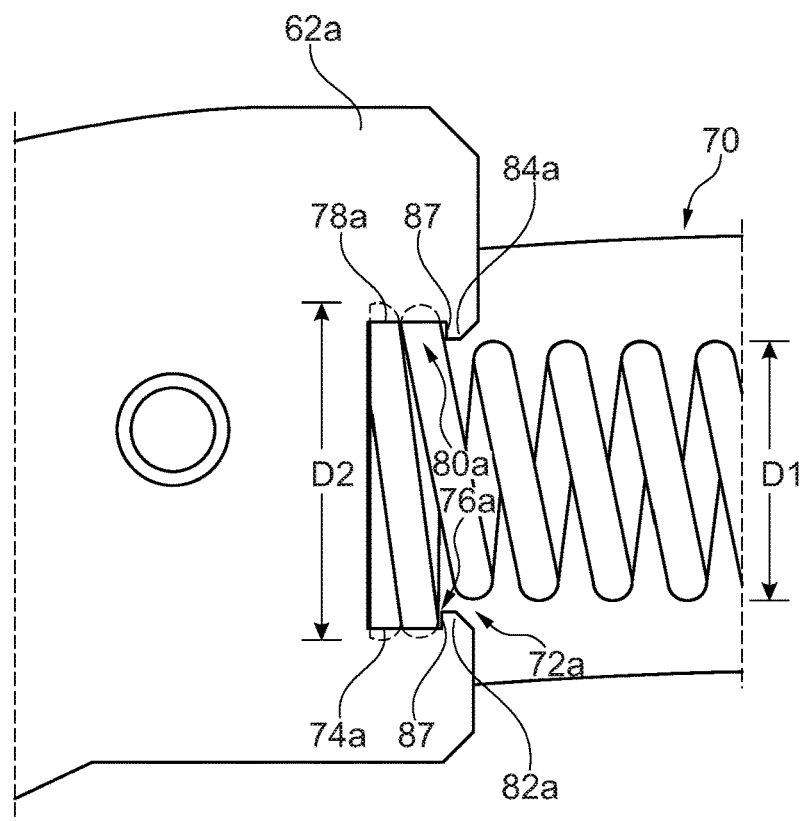
FIG. 3 shows an enlarged portion of FIG. 2.

FIG. 2 shows an axial facing view of a portion of CPA 32 along A-A in FIG. 1 and FIG. 3 shows an enlarged portion of FIG. 2. FIG. 2 shows portions of a first pair 88 of masses 62a, 62b and a second pair 90 of masses 62a, 62b being connected together by one spring 64, with only masses 62a being shown and masses 62b being obstructed by masses 62a and flange 60. Masses 62b are formed as mirror images of masses 62a when considered with respect to a plane extending radially through a center of flange 60. As noted above, spring 64 is formed by a plurality of central coils 66 and at least one end coil 68, 69 at each end of spring 64, with central coils 66 extending circumferentially from end coil 68 to end coil 69. Spring 64 is manufactured such that central coils 66 have a consistent outer diameter D1 that is less than an outer diameter D2 of end coils 68, 69. Lips 82a, 84a begin at outer diameter D2 and extend radially inward to contact the respective radially extending circumferentially facing edge 87, 89 of the respective at least one end coil 68, 69 and circumferentially retain the respective at least one coil 68, 69 so as to prevent the respective at least one end coil 68, 89 from moving circumferentially out of notch 72a.

In this preferred embodiment, notches 72a, 72b are configured such that the at least one end coils 68, 69 are held without an interference fit as done conventionally. Inner diameter surfaces of each of the at least one end coil 68, 69 are not in contact with masses 62a, 62b and each of the at least one end coil 68, 69 are not radially expanded by the masses 62a, 62b. Grooves 76a, 76b, 80a, 80b are designed to snugly contact the outer diameter surface of the respective at least one end coil 68, 69 without radially compressing or radially expanding the respective at least one end coil 68, 69. Notches 72a also include a radially extending base surface 92 for circumferentially contacting a respective radially extending circumferentially facing edge 94 of the respective at least one coil 68, 69. Base surface 94 extends radially from surface 74a to surface 78a.

Figure 4:
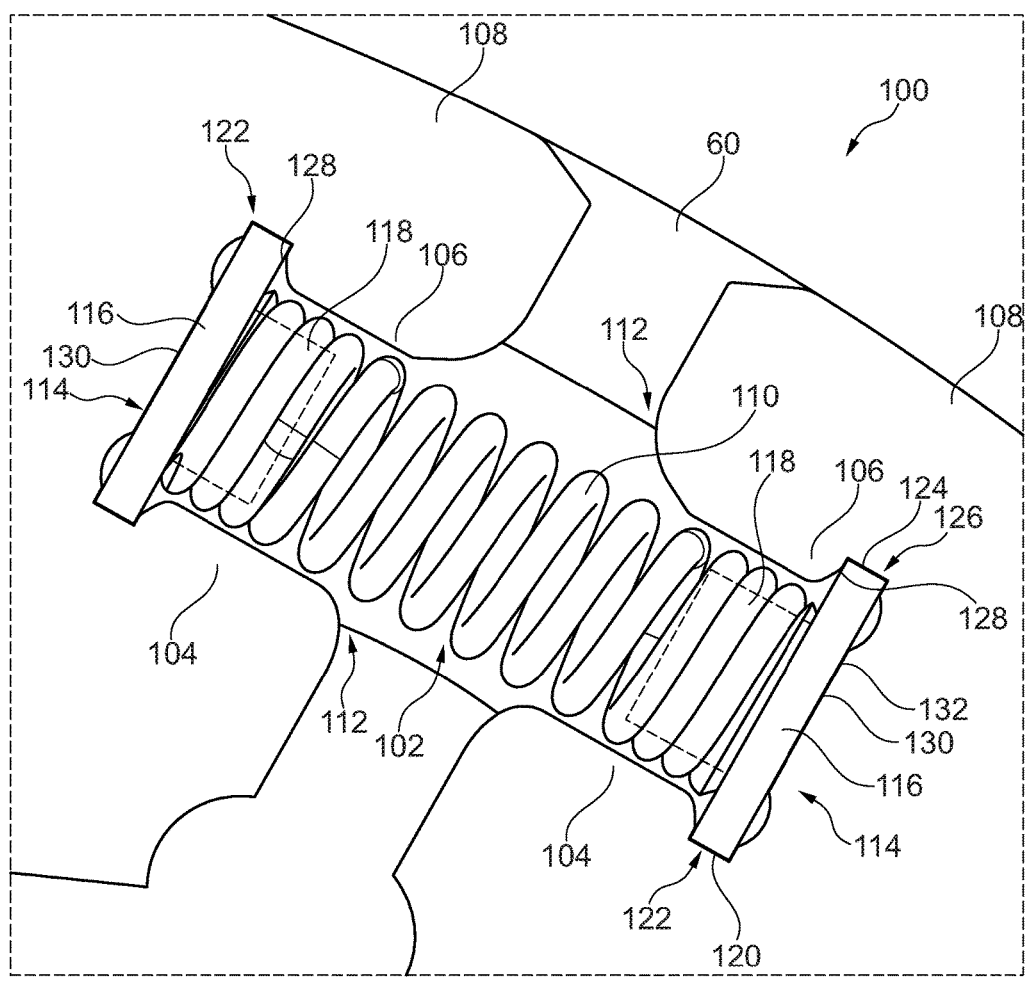
FIG. 4 shows an axially facing view of a portion of a CPA in accordance with an alternative embodiment of the present invention.

FIG. 4 shows an axially facing view of a portion of a CPA 100 in accordance with an alternative embodiment of the present invention. CPA 100 is formed in substantially the same manner as CPA 32, except that springs 102 are configured differently than springs 64 and lips 104, 106 of masses 108 are circumferentially thicker than lips 82a, 82b, 84a, 84b of masses 62a, 62b. Like CPA 32, CPA 100 includes a second set of masses on the opposite side of flange 60 that 62b are formed as mirror images of masses 108 when considered with respect to a plane extending radially through a center of flange 60. Springs 102 of CPA 100 include only coils 110 of the same diameter and springs 102 are held in notches 112 of masses 108 by endcaps 114. Endcaps 114 each include a disc shaped base 116 and a tubular protrusion 118 protruding from base 116 into a hollow interior of spring 102. Protrusion 118 is held tightly by an inner diameter surface of coils 110 by an interference fit.

Similar to the embodiment of FIGS. 1 to 3, masses 108 are also each provided with a respective notch 112 at both circumferential ends thereof, each for receiving the respective endcap 114. Notches 112, like notches 72a, 72b, each extend axially through the respective mass 106 and include a respective radially inner curved surface 120 defining a respective arc shaped groove 122 therein and a respective radially outer curved surface 124 defining a respective arc shaped groove 126 therein. Radially inner and outer lips 104, 106 define radially extending circumferentially facing edges of notches 112, with radially inner lips 104 extending radially outward from the respective groove 122 and radially outer lips 106 extending radially inward from the respective groove 126. Notches 112 also include a radially extending base surface 130 for circumferentially contacting the respective circumferential edge 132 of base 116. Base surface 130 extends radially from surface 120 to surface 124. Curved surfaces 120, 124 contact an outer diameter surface of the respective base 116 and lips 104, 106 contact the respective protrusion facing radially extending edge 128. Accordingly, curved surfaces 120, 124 are configured for axially and radially retaining the corresponding base 116 of the respective endcap 114 while lips 104, 106 are configured for circumferentially retaining the corresponding endcap 114 from pulling out of the notch 112. Grooves 122, 126 are designed to snugly contact the outer surface of the respective base 116 without radially compressing base 116. Bases 116 have a greater outer diameter than coils 110 and form enlarged end portions that protrude past the outer diameter of coils 110 and are connected to masses 108 without an interference fit.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A centrifugal pendulum absorber comprising:
   a pair of first masses each including a first notch defined in part by at least one radially extending first lip;
   a pair of second masses each including a second notch defined in part by at least one radially extending second lip; and
   a spring extending circumferentially from the first notches into the second notches, the spring connecting the first masses and the second masses, the spring including a first enlarged end portion having a larger outer diameter than an outer diameter of coils of the spring, the first enlarged end portion being connected to the first masses in the first notches without an interference fit via the at least one radially extending first lip of each of the first masses contacting the first enlarged end portion, the spring including a second enlarged end portion having a larger outer diameter than the outer diameter of the coils of the spring, the second enlarged end portion being connected to the second masses in the second notches without an interference fit via the at least one radially extending second lip of each of the second masses contacting the second enlarged end portion, the first notches each including a first radially inner surface defining a first groove therein, the first radially inner surface contacting an outer diameter surface of the first enlarged end portion without radially compressing or radially expanding the first enlarged end portion, the second notches each including a second radially inner surface defining a second groove therein, the second radially inner surface contacting an outer diameter surface of the second enlarged end portion without radially compressing or radially expanding the second enlarged end portion.

2. The centrifugal pendulum absorber as recited in claim 1 wherein the first enlarged end portion is formed by at least one first end coil of the spring and the second enlarged end portion is formed by at least one second end coil of the spring, the coils of the spring, whose outer diameter the at least one first end coil and the least one second end coil is larger than, being central coils circumferentially between the at least one first end coil and the least one second end coil.

3. The centrifugal pendulum absorber as recited in claim 1 wherein the first enlarged end portion is formed by a first base of a first endcap inserted into the coils and the second enlarged end portion is formed by a second base of a second endcap inserted into the coils.

4. The centrifugal pendulum absorber as recited in claim 1 wherein the at least one radially extending first lip of each of the first masses includes a radially inner lip extending radially outward from the outer diameter of the first enlarged end portion to contact a radially extending circumferentially facing edge of the first enlarged end portion and a radially outer lip extending radially inward from the outer diameter of the first enlarged end portion to contact the radially extending circumferentially facing edge of the first enlarged end portion, the at least one radially extending second lip of each of the second masses including a radially inner lip extending radially outward from the outer diameter of the first enlarged end portion to contact the radially extending circumferentially facing edge of the first enlarged end portion and a radially outer lip extending radially inward from the outer diameter of the first enlarged end portion to contact the radially extending circumferentially facing edge of the first enlarged end portion.

5. The centrifugal pendulum absorber as recited in claim 1 wherein the first masses each include a radially inner arc shaped surface and a radially outer arc shaped surface contacting the outer diameter surface of the first enlarged end portion, the second masses each including a radially inner arc shaped surface and a radially outer arc shaped surface contacting an outer diameter surface of the first enlarged end portion.

6. A torque converter comprising:
   a damper assembly including the centrifugal pendulum absorber as recited in claim 1.

7. A method of forming a centrifugal pendulum absorber comprising:
   providing a pair of first masses and a pair of second masses, each of the first masses including a first notch defined in part by at least one radially extending first lip, each of the second masses including a second notch defined in part by at least one radially extending second lip;
   inserting a first enlarged end portion of a spring into the first notches to fix the first enlarged end portion to the first masses without an interference fit via the at least one radially extending first lip of each of the first masses contacting the first enlarged end portion, the first enlarged end portion having a larger outer diameter than an outer diameter of coils of the spring; and
   inserting a second enlarged end portion of the spring into the second notches to fix the second enlarged end portion to the second masses without an interference fit via the at least one radially extending second lip of each of the second masses contacting the second enlarged end portion, the second enlarged end portion having a larger outer diameter than the outer diameter of the coils of the spring, the spring connecting the first pair of masses and the second pair of masses circumferentially together, the first notches each including a first radially inner surface defining a first groove therein, the first radially inner surface contacting an outer diameter surface of the first enlarged end portion without radially compressing or radially expanding the first enlarged end portion, the second notches each including a second radially inner surface defining a second groove therein, the second radially inner surface contacting an outer diameter surface of the second enlarged end portion without radially compressing or radially expanding the second enlarged end portion.

8. The method as recited in claim 7 wherein the first enlarged end portion is formed by at least one first end coil of the spring and the second enlarged end portion is formed by at least one second end coil of the spring, the coils, whose outer diameter the at least one first end coil and the least one second end coil is larger than, being central coils circumferentially between the at least one first end coil and the at least one second end coil, the method further comprising forming the spring to include the at least one first end coil of the spring having the larger outer diameter than the central coils and to include the at least one second end coil having the larger outer diameter than central coils before inserting the at least one first end coil into the first notches and before inserting the at least one second end coil into the second notches.

9. The method as recited in claim 7 wherein the first enlarged end portion is formed by a first base of a first endcap and the second enlarged end portion is formed by a second base of a second endcap, the method further including inserting the first endcap into contact with an inner diameter surface of a first end set of the coils and inserting the second endcap into contact with an inner diameter surface of a second end set of the coils.

10. The method as recited in claim 7 wherein the at least one radially extending first lip of each of the first masses includes a radially inner lip extending radially outward from the outer diameter of the first enlarged end portion to contact a radially extending circumferentially facing edge of the first enlarged end portion and a radially outer lip extending radially inward from the outer diameter of the first enlarged end portion to contact the radially extending circumferentially facing edge of the first enlarged end portion, the at least one radially extending second lip of each of the second masses including a radially inner lip extending radially outward from the outer diameter of the first enlarged end portion to contact the radially extending circumferentially facing edge of the first enlarged end portion and a radially outer lip extending radially inward from the outer diameter of the first enlarged end portion to contact the radially extending circumferentially facing edge of the first enlarged end portion.

11. The method as recited in claim 7 wherein the first masses each include a radially inner arc shaped surface and a radially outer arc shaped surface contacting an outer diameter surface of the first enlarged end portion, the second masses each including a radially inner arc shaped surface and a radially outer arc shaped surface contacting an outer diameter surface of the first enlarged end portion.

* * * * *